(12) United States Patent
Scharfer et al.

(10) Patent No.: US 10,399,112 B2
(45) Date of Patent: Sep. 3, 2019

(54) METHOD AND DEVICE FOR INTERMITTENT COATING (71) Applicant: Karlsruher Institut fuer Technologie, Karlsruhe (DE)

(72) Inventors: Philip Scharfer, Eggenstein-Leopoldshafen (DE); Marcel Schmitt, Karlsruhe (DE); Wilhelm Schabel, Karlsruhe (DE); Ralf Diehm, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 274 days.

(21) Appl. No.: 15/509,510

(22) PCT Filed: Aug. 7, 2015

(86) PCT No.: PCT/EP2015/001633
§ 371 (c)(1),
(2) Date: Mar. 8, 2017

(87) PCT Pub. No.: WO2016/037674
PCT Pub. Date: Mar. 17, 2016

(65) Prior Publication Data
US 2017/0252773 A1 Sep. 7, 2017

(30) Foreign Application Priority Data

Sep. 9, 2014 (DE) ........................ 10 2014 112 977

(51) Int. Cl.
*B05C 11/10* (2006.01)
*B05C 5/02* (2006.01)
(Continued)

(52) U.S. Cl.
CPC ........ *B05C 11/1034* (2013.01); *B05C 5/0258* (2013.01); *B05C 11/1047* (2013.01);
(Continued)

(58) Field of Classification Search
None
See application file for complete search history.

(56) References Cited

U.S. PATENT DOCUMENTS 4,938,994 A 7/1990 Choinski
6,455,105 B1 * 9/2002 Sakai .................... B05C 5/0258
118/410

(Continued)

FOREIGN PATENT DOCUMENTS

DE 10246327 A1 5/2003
DE 102004012476 A1 10/2005
JP 2001191005 A 7/2001

*Primary Examiner* — Nathan T Leong
(74) *Attorney, Agent, or Firm* — Leydig, Voit & Mayer, Ltd.

(57) ABSTRACT

A device for intermittent coating of a substrate moving in a transport direction relative to the device includes a nozzle body comprising two nozzle jaws; an insertion film having a cut-out provided between the two nozzle jaws, wherein the cut-out in the insertion film forms a nozzle slot within the nozzle body, wherein the nozzle slot extends transversely to the transport direction of the substrate and in parallel with the substrate, and wherein the nozzle slot ends in an outlet gap; and a supply channel, wherein the outlet gap is in flow connection with the supply channel via the nozzle slot. A first of the two nozzle jaws is provided with at least two openings which lead into the nozzle slot in series between the supply channel and the outlet gap and which are closed in a fluid-tight manner toward the nozzle slot by at least two elastically deformable elements.

7 Claims, 6 Drawing Sheets

(51) Int. Cl.
*H01M 4/04* (2006.01)
*H01M 4/139* (2010.01)
*H01M 4/62* (2006.01)
*H01M 10/0525* (2010.01)
*B05D 1/26* (2006.01)
*H01M 10/052* (2010.01)
*H01M 6/40* (2006.01)
*B05D 7/00* (2006.01)

(52) U.S. Cl.
CPC ....... *H01M 4/0404* (2013.01); *H01M 4/0419* (2013.01); *H01M 4/139* (2013.01); *H01M 4/622* (2013.01); *H01M 10/0525* (2013.01); *B05D 1/26* (2013.01); *B05D 7/5423* (2013.01); *H01M 4/0414* (2013.01); *H01M 6/40* (2013.01); *H01M 10/052* (2013.01)

(56) References Cited

U.S. PATENT DOCUMENTS

2002/0017238 A1* 2/2002 Shinozaki ............. B05C 5/0258
                                                                                                 118/668
2003/0080307 A1 5/2003 Jackson et al.

* cited by examiner

METHOD AND DEVICE FOR INTERMITTENT COATING

CROSS REFERENCE TO RELATED APPLICATIONS

This application is a U.S. National Stage Application under 35 U.S.C. § 371 of International Application No. PCT/EP2015/001633 filed on Aug. 7, 2015, and claims benefit to German Patent Application No. DE 10 2014 112 977.6 filed on Sep. 9, 2014. The International Application was published in German on Mar. 17, 2016 as WO 2016/037674 A1 under PCT Article 21(2).

FIELD

The invention relates to a method and a device for the intermittent coating of a moving substrate.

BACKGROUND

Japanese published patent application JP 2001 191 005 A discloses a device for the intermittent application of adhesive to a continuously running body. In said document, a method is disclosed which supplies a hot melt to a nozzle and applies it to a continuously running substrate. It is disclosed that the supply of hot melt to the nozzle is interrupted when no coating is to be produced. By repeating this process, a substrate is intermittently coated.

Alternatively, intermittent coating can be achieved by increasing the coating gap between the nozzle and the substrate with each interruption to the coating. However, the wake of the coating substance, which still occurs, wets the nozzle lips, and this results in an excessively high start edge when the substrate (arrester film) is approached again. A further drawback of this approach is that the movement of the nozzle and the placement of the wetted nozzle lips on the substrate cause vibrations in the substrate, which in turn influence the spacing between the nozzle lips and the substrate. Accordingly, it is not possible to achieve a continuous wet film thickness.

Secondary lithium ion batteries are based on an arrangement of a plurality of electrochemical cells. The electrodes in an electrochemical cell each comprise an active material from which lithium ions are intercalated into the electrodes during operation of the electrochemical cell. A lithium-containing oxide compound, preferably $LiCoO_2$, $LiFePO_4$, $LiNi_{1/3}Co_{1/3}Mn_{1/3}O_2$ (NCM) or $LiNi_{0.8}Co_{0.15}Al_{0.05}O_2$ (NCA), mesoporous titanium oxide, is used as the active material in the negative electrode (cathode), and conductive carbon black, carbon black, graphite or the like is used in the positive electrode (anode).

DE 10 2004 012 476 A1 discloses suitable coating substances and the production thereof, which are hereby incorporated into the present application by reference.

In a coating method proposed herein, the polymer binder required for the cathode and anode coating compound (coating substance) is dissolved for example in 5-10% fluoroelastomer homopolymerizate or copolymerizate in N-methyl pyrrolidone (NMP), and the resulting polymer solution is mixed with the cathode-specific or anode-specific additives, such as metal oxide intercalatable with lithium or carbons intercalatable with lithium (conductive carbon black, carbon black, graphite or the like), and is dispersed. Subsequently, this dispersion is applied to the substrate, in this case the current collectors or a collector body such as foils, strips, meshes or the like, by film-coating.

Alternatively, polyvinylidene fluoride, on the cathode side, and styrene butadiene rubber, on the anode side, may also be used as a binder to improve the mechanical strength, and also provided with conductive carbon black to increase the electrical conductivity. The active materials are accordingly applied to the substrate or the metal arrester material in the form of pastes (coating substance) using solvents and using carboxymethyl cellulose as a thickener.

Because of the low electrical conductivity of the porous particulate layer morphologies, the applied electrode layer (wet film) has inadequate discharge rate properties. In order to increase the electrical collection capacity, the applied electrode layer that is applied to the electrically conductive substrate (collector body, electrode) therefore has to be made as thin as possible. Preferably, wet film thickness of the menisci of between 10 μm (high power) and 850 μm (high capacitances) are aimed for.

M. Schmitt et al., "Slot-die processing of lithium-ion battery electrodes—Coating window characterization", Chemical Engineering and Processing: Process Intensification, Volume 68, June 2013, pages 32-37, and M. Schmitt et al., "Slot die coating of lithium-ion battery electrodes: investigations on edge effect issues for stripe and pattern coatings", Journal of Coatings Technology and Research January 2014, Volume 11, Issue 1, pp. 57-63, teach a suitable method for coating foil electrodes using a slotted nozzle, and the optimum operating conditions for carrying out this method as regards the geometrical dimensions of a suitable device, and are hereby incorporated into the present application by reference.

In order to obtain exact (film) start edges and (film) end edges for the layers or coating portions, it is already known from DE 10 246 327 A1 to retract the coating substance after blocking (closing) the supply channel; this effect is known as "snuff-back". Downstream of the blocking means and upstream of the outlet, the coating substance is stopped and moved backwards by a negative pressure counter to the original flow direction.

US 2002/0017238 A1 discloses an alternative, disclosing a device which applies an intermittent coating to a moving substrate, the coating interruption being brought about not by means of closure by a blocking means in connection with snuff-back upstream of the outlet, but rather by a combination of a change in the internal volume of the slotted nozzle in connection with a snuff-back effect. This is brought about by an adjustment unit in nozzle jaws actively moving the flexible element back and forth. The active increase in volume brings about a suction effect, causing the snuff-back to act on the coating substance in the outlet gap. Accordingly, the flow direction and the shear stress τ present in the coating substance are reversed in direction. Before being applied to the substrate, the coating substance is temporarily stored here DE 10 246 327 in the cavity subjected to negative pressure or in the flexible volume. The stored coating substance is then applied during a subsequent coating cycle.

However, it has been shown that, as a result, undesired pressure fluctuations or pressure spikes occur in the system, and lead to faults precisely at the start of the coating process. Pressure spikes occur as a result of the abrupt opening of the blocking means (valve). The reduction in the flexible internal volume, as the coating substance stored in the cavity is supplied to the displaced volume flow again, causes an undefined input flow to form in the nozzle slot. This is because the shear stress τ of the displaced volume flow is in a different direction from that of the partial volume flow held back by the snuff-back. Thus, a change in direction in the shear stress of the held-back partial volume flow first has to be brought about in order to achieve a sufficiently high stationary shear or shear stress τ toward the nozzle outlet. Accordingly, the input flow is not sufficiently pronounced, and undesired transverse or longitudinal stripes form on the coatings produced.

Further, the flow and processing properties of the coating substance for producing electrode layers for Li ion cells are crucial for the configuration of the device and method. Shear speeds $\dot{\gamma}$ (shear rates) of the coating substance of up to 100,000 s$^{-1}$ are achieved here. The shear speed is calculated from the ratio of the speed difference between two adjacent liquid layers and the spacing therebetween. In mathematical terms, the shear speed is the gradient of the speed field.

This is of crucial importance, precisely for the coating substances used herein, since said substances behave in a pseudoplastic or shear-thinning manner. Thus, a volume flow only occurs under the action of a shear stress τ above a minimum shear stress $\tau_f$ (flow limit).

A further drawback of the devices known from the prior art is that they merely apply sequential coatings intermittently. Simultaneous application of a plurality of layers on top of one another is not provided.

SUMMARY

In an embodiment, the present invention provides a device for intermittent coating of a substrate, the substrate moving in a transport direction relative to the device. The device includes a nozzle body comprising at least two nozzle jaws; an insertion film having a cut-out provided between the nozzle jaws, wherein the cut-out in the insertion film forms a nozzle slot within the nozzle body, wherein the nozzle slot extends transversely to the transport direction of the substrate and in parallel with the substrate, and wherein the nozzle slot ends in an outlet gap; and a supply channel, wherein the outlet gap is in flow connection with the supply channel via the nozzle slot. A first of the nozzle jaws is provided with at least two openings which lead into the nozzle slot in series between the supply channel and the outlet gap and which are closed in a fluid-tight manner toward the nozzle slot by at least two elastically deformable elements. Each of the elastically deformable elements is operatively connected to the coating substance in the nozzle slot on a side and to an actuator in the direction of the nozzle slot on an other side. The openings of the first nozzle jaw are arranged successively in a flow direction of the coating substance proceeding from the supply channel to the outlet gap.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1b schematically shows the geometric ratios at an outlet gap of the device of FIG. 1a;

DETAILED DESCRIPTION

A device and a method are described herein which provide intermittent coating of a moving substrate at a constant wet film thickness whilst respecting exact film edges, and thus overcome drawbacks and restrictions known from the prior art.

A device is described herein that comprises a nozzle body having at least two nozzle jaws. An insertion film having at least one cut-out is provided between the opposing nozzle jaws. The cut-out in the insertion film forms at least one nozzle slot within the nozzle body. The nozzle slot ends transversely to the transport direction U of the substrate relative to the nozzle body and in parallel with the substrate, as an outlet gap of the nozzle body, the outlet gap being in flow connection with the supply channel. At least one nozzle jaw is provided with at least two openings which lead into the nozzle slot and which are each closed toward the nozzle slot and toward the outside by means of an elastically deformable element in connection with a cover and a sealing element. Each elastically deformable element is connected to the coating substance in the nozzle slot on one side and to an actuator on the other side. The openings of a nozzle jaw are arranged successively in the flow direction q of the coating substance, proceeding from the supply channel to the outlet gap.

A method for the intermittent coating of a moving substrate includes the following method steps, wherein displaced volume flow q of the coating substance remaining constant throughout all the method steps. The coating substance is displaced by a pump, proceeding from the supply channel to the outlet gap, via the nozzle slot, at a constant displaced volume flow q. As a result of the unloading (first switch position) of the flexible element closest to the outlet gap, brought about by reducing the force or counter force of the associated actuator, and of simultaneous loading (second switch position) of the flexible element closest to the supply channel, brought about by increasing the counter force of the associated actuator, the application of the coating substance to the substrate is interrupted. The loading and unloading of the actuator(s) is referred to here as the switching state, in each switching state the direction of the force exerted by the actuator on the flexible element not changing, but just the magnitude of the exerted force changing.

As a result of the loading of the flexible element closest to the outlet gap, brought about by the increase in the counter force of the associated actuator, and of the simultaneous unloading of the flexible element closest to the supply channel, brought about by the reduction in the counter force of the associated actuator, the application of the coating substance to the substrate is reestablished.

A method for intermittent coating of a substrate that is in motion includes the following method steps, wherein the displaced volume flow of the coating substances or coating substance $q_a$ and $q_b$ remain constant throughout all the method steps, and the coating portions overlapping. The coating substance or coating substances A, B is/are displaced by means of one or two pumps, proceeding from the associated supply channel via the associated nozzle slot to the corresponding outlet gap. As a result of the simultaneous unloading (first switch position) of the flexible elements closest to the respective outlet gaps, brought about by the reduction in the counter force of the associated actuator, and of simultaneous loading of the flexible elements closest to the respective supply channels, brought about by the increase in the counter force (second switch position) of the associated actuator, the application of the coating substances A, B or of the coating substance to the substrate is interrupted. As a result of the simultaneous loading of the flexible elements closest to the respective outlet gaps, brought about by the increase in the counter force (second switch position) of the associated actuator, and of the simultaneous unloading of the flexible elements closest to the respective supply channels, brought about by the reduction in the counter force (second switch position) of the associated actuator, the application of the coating substances or coating substance to the substrate is reestablished.

A method for intermittent coating of a substrate that is in motion includes the following method steps, wherein the displaced volume flow $q_a$ and $q_b$ of the coating substances or coating substance remain constant throughout all the method steps and the coating portions not overlapping. The coating substance or coating substances are displaced by means of a pump, proceeding from the associated supply channel via the relevant nozzle slot to the corresponding outlet gap. As a result of the unloading of the flexible elements in a nozzle jaw closest to the outlet gap, brought about by the reduction in the counter force (first switch position) of the associated actuator, and of simultaneous loading of the flexible element closest to the supply channel, brought about by the increase in the counter force (second switch position) of the associated actuator, the application of the coating substance through this nozzle gap to the substrate is interrupted. At the same time, in the opposing nozzle jaw, as a result of the loading of the flexible element closest to the outlet gap, brought about by the increase in the counter force (second switch position) of the associated actuator, and of the simultaneous unloading of the flexible element closest to the supply channel, brought about by the reduction in the counter force (first switch position) of the associated actuator, the application of the coating substance to the substrate is carried out. Subsequently, the method is repeated in the reverse sequence.

Figure 1A:
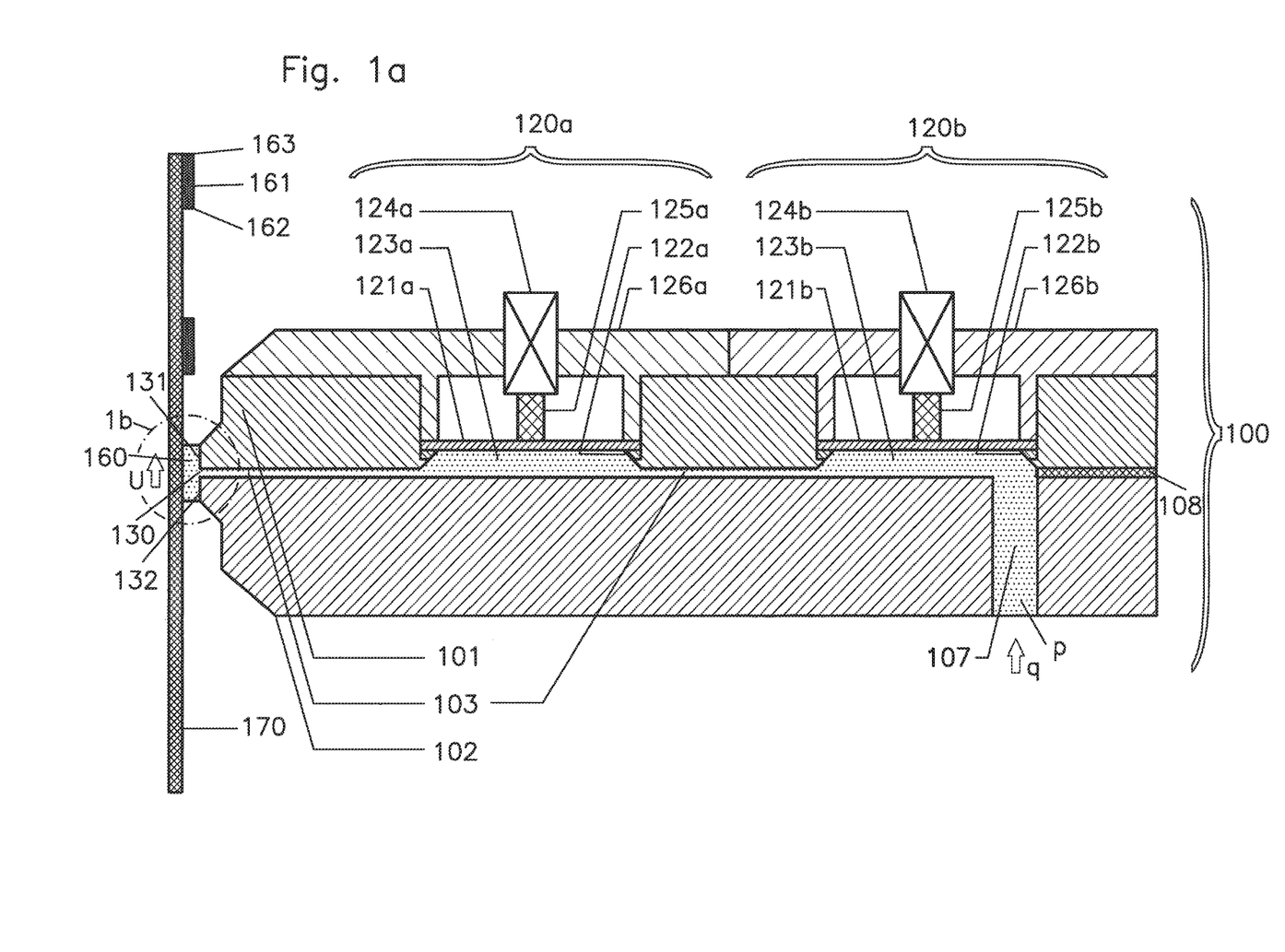
FIG. 1a is a schematic drawing of a device according to an embodiment of the invention for intermittent coating having a variable internal volume, during the coating phase.

FIG. 1a is a schematic drawing of a device according to an embodiment of the invention for intermittent coating having a variable internal volume, during the coating phase. FIG. 1a is a section through a device according to the invention for intermittent coating 100 having a variable internal volume. A nozzle slot 103 is adjusted between two nozzle jaws 101, 102 by means of an insertion film 108 having a cut-out. The insertion film 108 extends over the entire length and width of the nozzle jaws 101, 102 and is preferably made of metal having a thickness of between 0.01 mm and 3.00 mm, preferably between 0.05 mm and 1.0 mm, particularly preferably between 0.3 mm and 0.5 mm. The cut-out forms a cavity in the assembly, which extends from the supply channel 107 to the outlet gap 130. In this case, the outlet gap 130 of the device is positioned transversely to the transport direction U of the substrate 170 and in parallel with the substrate 170.

Upstream of the nozzle outlet 130, an opening 123 is provided in the nozzle jaw 101, an adjustment unit 120a being integrated into the opening 123. The arrangement comprises a flexible element 121a, flexible being defined here in the meaning of yielding or bendable, associated with a sealing element 122a, an actuator 124a, an associated planar attachment 125a and a cover 126a. For this purpose, the elastically deformable element 121a is fixed and sealed in position on a lug in the nozzle jaw 101 at the edge regions in the opening 123a by a sealing element 122a and the cover 126a. The height of the nozzle slot 103, and thus the overall volume of the nozzle slot 103, can be varied by the elastically deformable element 121a. In order to monitor the deformation of the flexible element 121a and thus of the variable volume in the nozzle slot 103, a suitable sensor system (not shown) is integrated into the cover 126a.

In the central region of the flexible element 121a, an actuator 124a is provided. The actuator 124a is in contact with the flexible element 121a via an attachment 125a, and can thus control the deformation of the flexible element 121a. The flexible element 121a, to which the force of the feed pump is applied from the nozzle slot, is held in position and shape by the counter force or increasing counter force of the actuator 124a (second switch position), in other words the actuator presses the flexible element 121a toward the nozzle slot 130, but the nozzle slot 130 is not constricted thereby.

A further adjustment unit 120b is additionally likewise integrated into the same nozzle jaw 103, said further adjustment unit being positioned between the adjustment unit 120b and the supply channel 107. As a result, the volume in the nozzle slot 103 can likewise be varied, no increase in the volume of the nozzle slot 103 being anticipated using the adjustment unit 120b. The pressure falls continuously progressing within the nozzle body 100 or the nozzle slot 103 proceeding from the supply channel 107 to the outlet gap 130. The shear stress τ is above the flow limit $\tau_f$ throughout the nozzle slot 103.

Figure 1B:
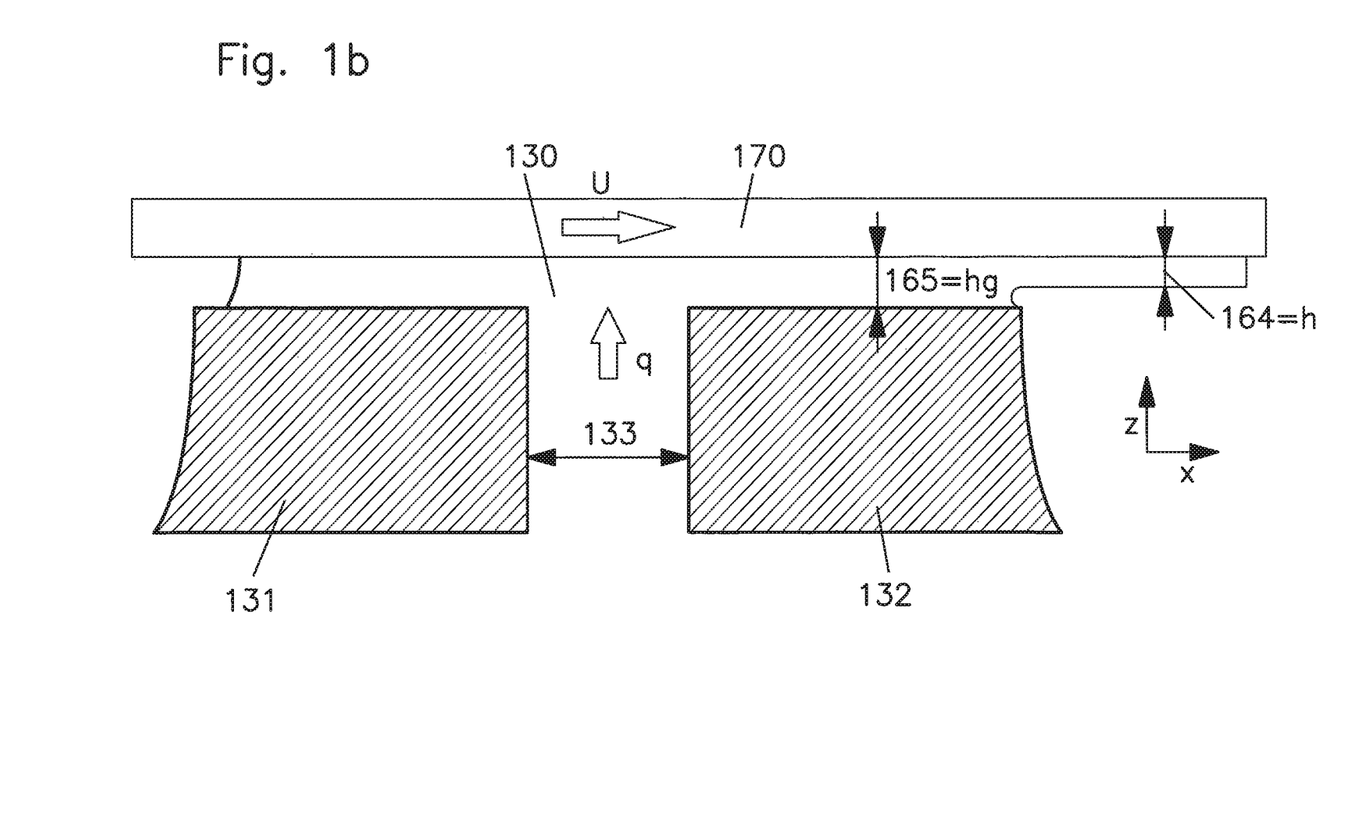

FIG. 1b schematically shows the geometric ratios at the outlet gap. FIG. 1b schematically shows the geometric ratios at the outlet gap 130. The nozzle slot 103 ends transversely to the transport direction U of the substrate 170 and in parallel with the substrate 170 as an outlet gap 130 of the nozzle body 100 (cf. FIG. 1a), the outlet gap 130 being in flow connection with the supply channel 107 (cf. FIG. 1a) via the nozzle slot 103. The width of the outlet gap 165 corresponds, in this case, to the thickness of the insertion film 108, and defines the spacing between the upstream nozzle lip 131 and the downstream nozzle lip 132. During the coating process, a liquid bridge 160 is formed between the outlet gap 130 or the two nozzle lips (131, 132) and the substrate 170 that is in motion. The thickness of the liquid bridge 165 is greater than the desired wet film thickness 164.

Figure 1C:
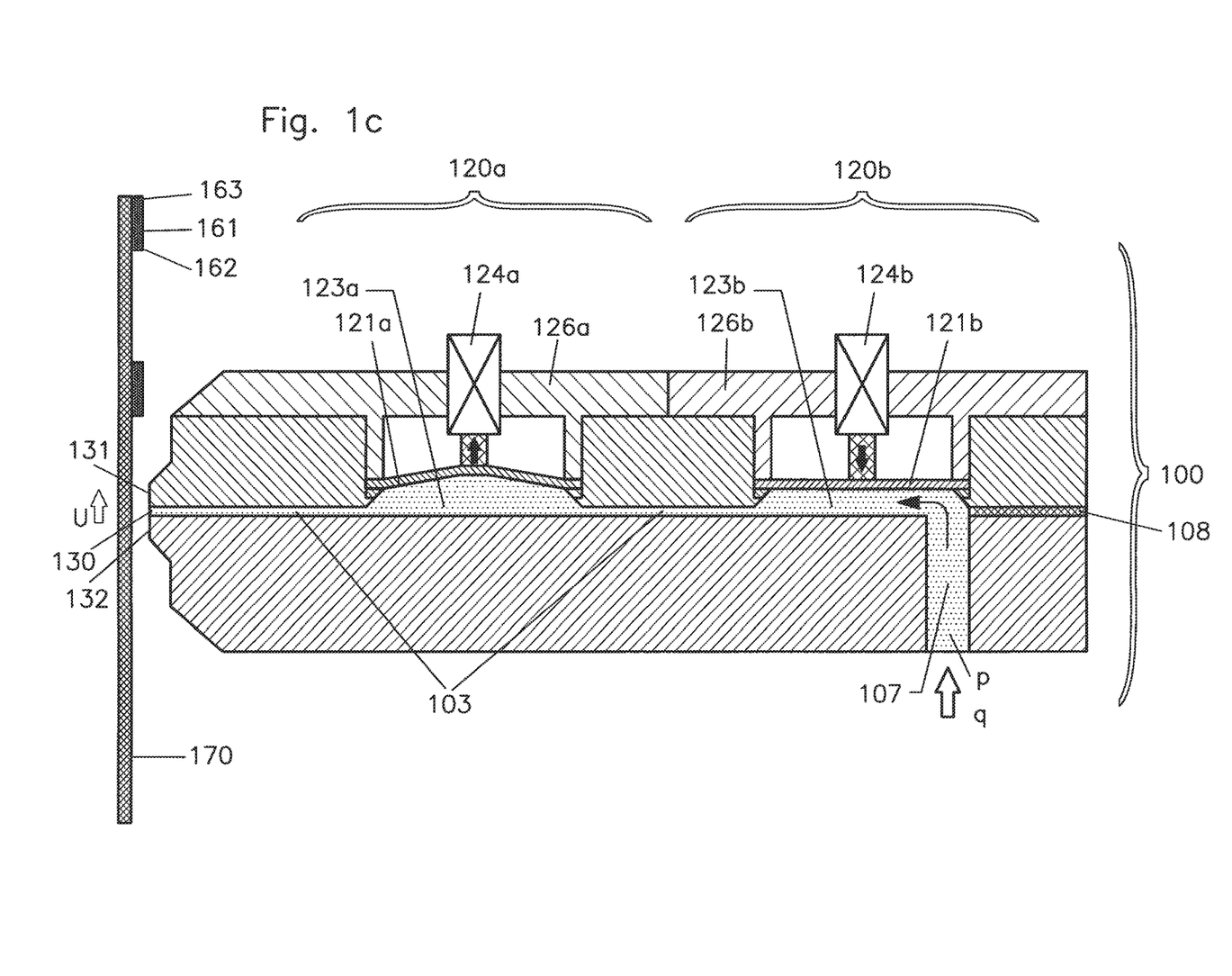
FIG. 1c is a schematic drawing of a device according to an embodiment of the invention for intermittent coating having a variable internal volume, during the start of the interruption phase.

FIG. 1c is a schematic drawing of a device according to an embodiment of the invention for intermittent coating having a variable internal volume, during the start of the interruption phase. FIG. 1c schematically shows the device according to the invention during the start of the interruption phase. In this case, by deactivating the actuator 124a, the flexible element 121a is deformed simply by the action of the system pressure p in a manner resulting in an increase in volume in this portion of the nozzle slot 103.

The change in the increase of the volume in this portion over time is set in such a way that the further incoming coating substance is incorporated into the variable volume of the nozzle slot 103. At the same time, the pressure within the nozzle slot 103 toward the outlet gap 130 thus immediately falls approximately to ambient pressure. This results in the liquid bridge 160 (cf. FIG. 1b) being torn off at the nozzle slot 103. Accordingly, the shear stress $\tau$ toward the outlet gap 130 is below the flow limit $\tau_f$. However, the shear stress $\tau$ does not change direction with respect to the outlet gap 130 and is greater than 0. At the same time, by activating the actuator 124a, the flexible element 121b is deformed in a manner resulting in a reduction in the nozzle slot 103. As a result, a constriction is produced in the nozzle slot 103, and brings about a local increase in pressure. The shear stress $\tau$ in the coating substance is thus increased, and the flow speed in this portion increases. Local pressure fluctuations are thus produced, and directly result in local flow speeds so as to control the coating process optimally.

Figure 1D:
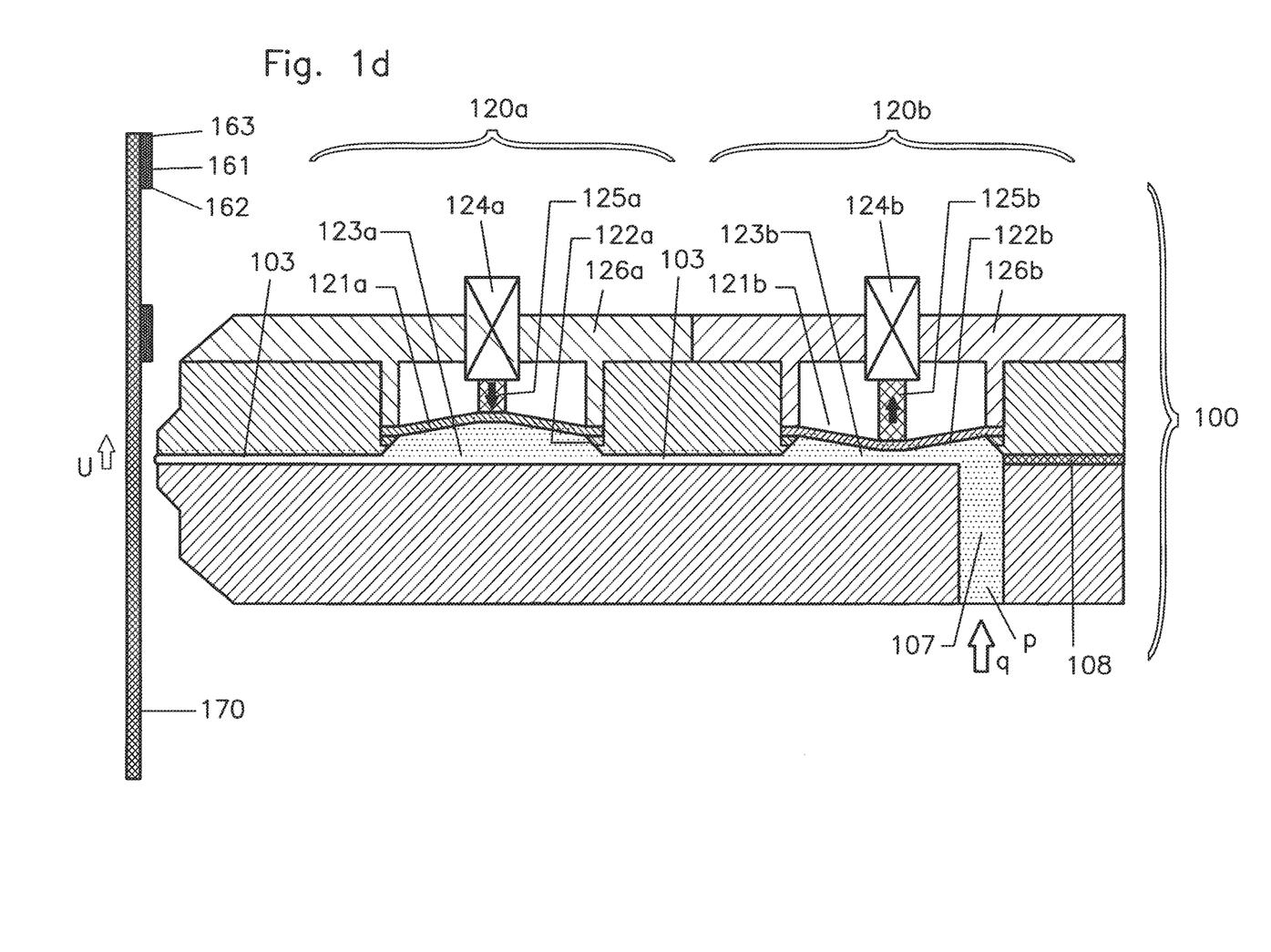
FIG. 1d is a schematic drawing of a device according to an embodiment of the invention for intermittent coating having a variable internal volume, during the end of the interruption phase or the start of the coating phase.

FIG. 1d is a schematic drawing of a device according to an embodiment of the invention for intermittent coating having a variable internal volume, during the end of the interruption phase or the start of the coating phase. At the start of the subsequent coating phase, the outlet gap 130 or the variable internal volume is reduced in the region of the flexible element 121a by the adjustment unit 120a.

A slight change in volume and the resulting increased pressure in the coating substance are sufficient to overcome the flow limit $\tau_f$ of the coating substance. The shear stress $\tau$ that is still present in the coating substance in the nozzle slot 103 between the outlet gap 130 and the region around the flexible element 124a reduces the required initial impulse. The variable internal volume is now continuously reduced in a manner distributed over the entire coating phase, or the flexible element 121 is deformed in such a way that the nozzle slot 103 is reduced but does not become smaller than the gap width 133 set by the insertion film 108.

The coating substance already present in the variable internal volume is thus supplied to the displaced volume flow q. For a defined wet film thickness 164, the speed of the supplied coating substance is adjusted to the substrate speed. Accordingly, the adjustment takes place by way of the movement speed or the progression over time of the opposing force from the actuator 124a.

Figure 2A:
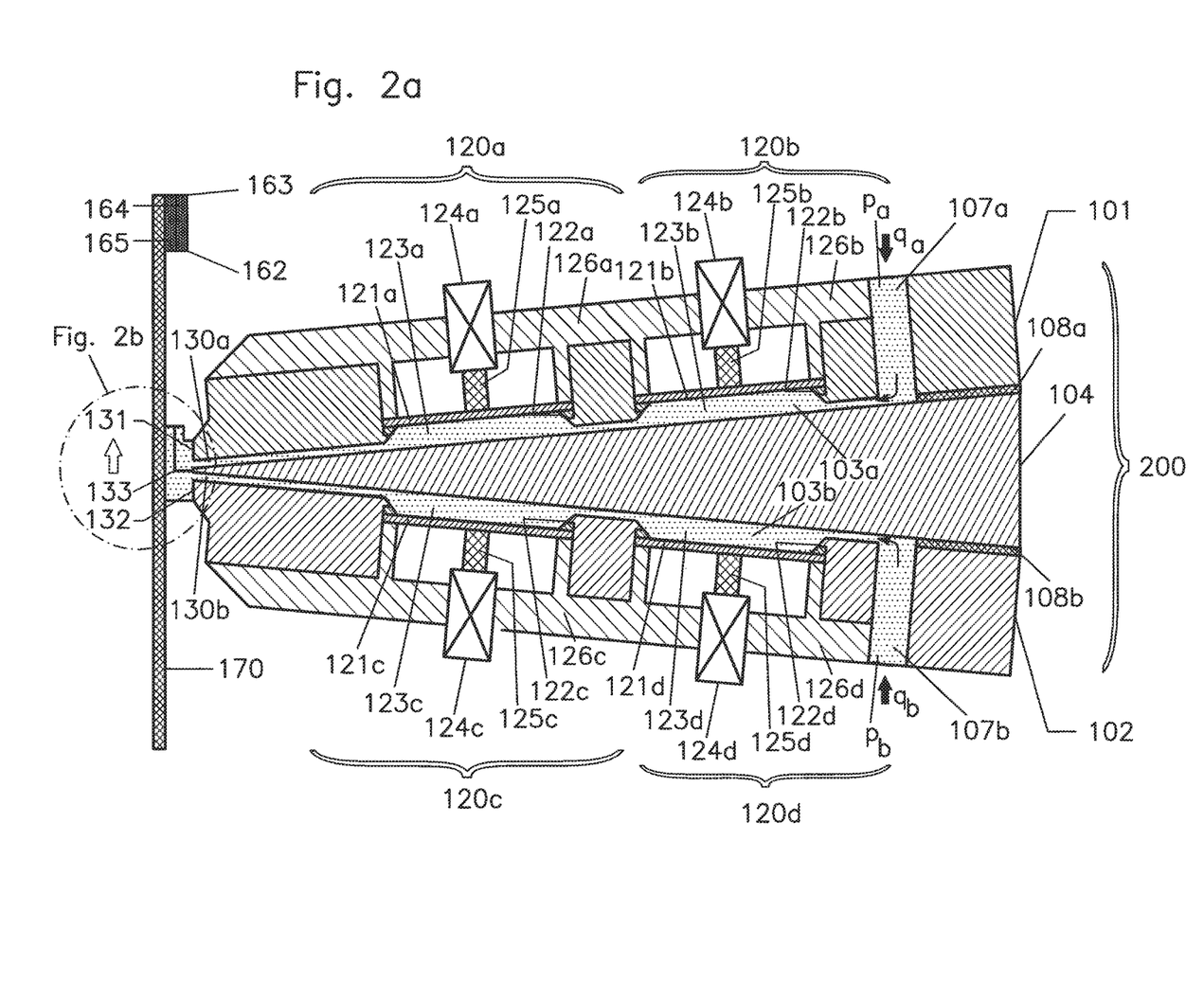
FIG. 2a is a schematic drawing of a device comprising a double gap according to an embodiment of the invention for intermittent coating having a variable internal volume.

FIG. 2a is a schematic drawing of a device according an embodiment of the invention for intermittent coating having a variable internal volume, comprising a double gap. In FIG. 2a, the nozzle jaws 101, 102 of the device 200 are arranged together with the adjustment unit 120a, 120b and 120c, 120d symmetrically about a preferably wedge-shaped partition plate 104. Accordingly, a further nozzle slot 103 is produced between the partition plate 104 and the nozzle jaw 102, by using an additional insertion film 108. As a result, coating using two different coating substances simultaneously is possible, as well as coating at twice the speed using the same coating substance. Additionally, coating in two layers can be carried out.

Figure 2B:
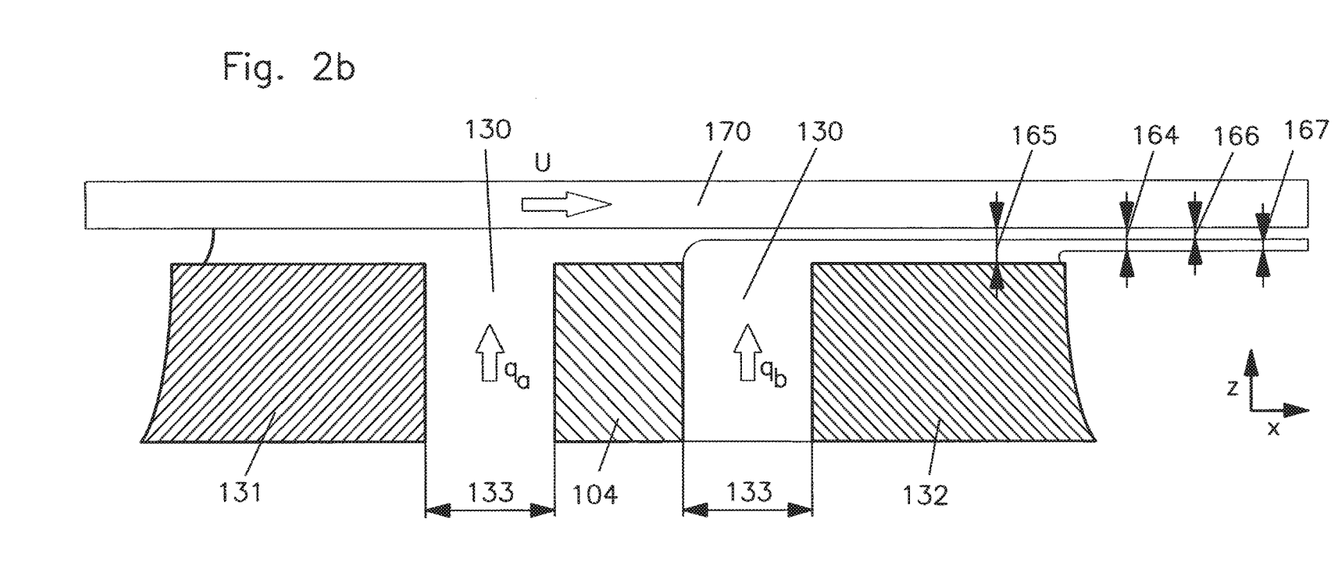
FIG. 2b schematically shows geometric ratios at the outlet gap of a device according to the invention comprising a double gap.

FIG. 2b schematically shows the geometric ratios at the outlet gap of a device according to an embodiment of the invention comprising a double gap. FIG. 2b schematically shows the geometric ratios at the outlet gap 130. The nozzle slots 103 each end transversely to the transport direction U of the substrate 170 and in parallel with the substrate 170 as an outlet gap 130 of the nozzle body 200 (cf. FIG. 2b), each outlet gap 130 being in flow connection with the relevant supply channel 107 (cf. FIG. 2) via the relevant nozzle slot 103. In this case, the width of the relevant outlet gap 133 corresponds to the thickness of the insertion film 108, and defines the spacing between the upstream nozzle lip 131 and the downstream nozzle lip 132. The partition plate 104 is arranged therebetween.

This thus results in a further outlet gap 133 to which a different coating substance is fed. During the coating process, a fluid bridge 160 is formed between the relevant outlet gap 130 or the two nozzle lips 131, 132 and the substrate 170 that is in motion. However, the liquid bridge 160 here is different from that of FIG. 1b, in that the thickness of the liquid bridge 160 is a result of the two partial flows $q_a$ and $q_b$. Accordingly, the wet film thickness 164 is a result of the wet film thickness 166 of the coating substance A and the wet film thickness 167 of the coating material B.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 200 Device for intermittent coating
101 Nozzle jaw
102 Nozzle jaw
103 Nozzle slot
104 Partition plate
105 Nozzle jaw recess
107 Supply channel
108 Insertion film
120 Adjustment unit
121 Flexible element
122 Sealing element
123 Opening
124 Actuator
125 Point, linear or planar attachment of the actuator
126 Cover
130 Outlet gap
131 Upstream nozzle lip
132 Downstream nozzle lip
133 Wide outlet gap
160 Liquid bridge
161 Wet film, liquid film on the substrate
162 End edge, film end edge
163 Start edge, film start edge 164 Wet film thickness
165 Thickness of liquid bridge 160
166 Wet film thickness of coating substance A
167 Wet film thickness of coating substance B
170 Substrate
U Movement direction of the substrate
q, qa, qb Displaced volume flow
p Pressure

The invention claimed is:

1. A device for intermittent coating of a substrate, the substrate moving in a transport direction relative to the device, the device comprising:
   a nozzle body comprising at least two nozzle jaws,
   an insertion film having a cut-out being provided between the nozzle jaws, wherein
   the cut-out in the insertion film forms a nozzle slot within the nozzle body, wherein the nozzle slot extends transversely to the transport direction of the substrate and in parallel with the substrate, and wherein the nozzle slot ends in an outlet gap, and
   a supply channel, wherein the outlet gap is in flow connection with the supply channel via the nozzle slot,
   wherein a first of the nozzle jaws is provided with at least two openings which lead into the nozzle slot in series between the supply channel and the outlet gap and which are closed in a fluid-tight manner toward the nozzle slot by at least two elastically deformable elements,
   wherein each of the elastically deformable elements is operatively connected to the coating substance in the nozzle slot on a side and to an actuator in the direction of the nozzle slot on an other side, and
   wherein the openings of the first nozzle jaw are arranged successively in a flow direction of the coating substance proceeding from the supply channel to the outlet gap.

2. The device according to claim 1, wherein a partition plate is arranged between the nozzle jaws, wherein the insertion film having the cut-out is provided between the first of the nozzle jaws and the partition plate, wherein an additional insertion film having a cut-out is provided between a second of the nozzle jaws and the partition plate, and wherein the cut-out in the additional insertion film forms an additional nozzle slot within the nozzle body between each of the nozzle jaws and the partition plate.

3. A method for intermittent coating of a substrate that is in motion using the device according to claim 2, wherein a first and a second displaced volume flow remains constant, the method comprising:
   a) continuously supplying a coating substance, proceeding from the supply channel and an additional supply channel to the outlet gap and an additional outlet gap via the nozzle slot and the additional nozzle slot,
   b) unloading a first of the elastically deformable elements and a first of at least two additional elastically deformable elements in a first of the openings and a first of additional openings by deactivating the actuator to which the first elastically deformable element is operatively connected and an actuator to which the first additional elastically deformable element is operatively connected,
   c) loading a second of the elastically deformable elements and a second of the additional elastically deformable elements in a second of the openings and a second of the additional openings by activating the actuator to which the second elastically deformable element is operatively connected and an actuator to which the second additional elastically deformable element is operatively connected,
   d) loading the first elastically deformable element and the first additional elastically deformable element in the first opening and the first additional opening by activating the actuator to which the first elastically deformable element is operatively connected and an actuator to which the first additional elastically deformable element is operatively connected, and
   e) unloading the second elastically deformable element and the second additional elastically deformable element in the second opening and the second additional opening by deactivating the actuator to which the second elastically deformable element is operatively connected and an actuator to which the second additional elastically deformable element is operatively connected.

4. A method for intermittent coating of a substrate that is in motion using a device according to claim 2, wherein a first and a second displaced volume flow remain constant, the method comprising:
   a) continuously supplying a coating substance, proceeding from the supply channel and an additional supply channel to the outlet gap and an additional outlet gap via the nozzle slot and the additional nozzle slot,
   b) unloading a first of the elastically deformable elements in a first of the openings by deactivating the actuator to which the first elastically deformable element is operatively connected,
   c) loading a second of the elastically deformable elements in a second of the openings by activating the actuator to which the second elastically deformable element is operatively connected,
   d) loading a first of additional elastically deformable elements in a first of additional openings by activating an actuator to which the first additional elastically deformable element is operatively connected,
   e) unloading a second of the additional elastically deformable elements in a second of the additional openings by deactivating an actuator to which the second additional elastically deformable element is operatively connected,
   f) unloading the first additional elastically deformable element in the first additional opening by deactivating the actuator to which the first additional elastically deformable element is operatively connected,
   g) loading the second additional elastically deformable element in the second additional opening by activating the actuator to which the second additional elastically deformable element is operatively connected,
   h) loading the first elastically deformable element in the first opening by activating the actuator to which the first elastically deformable element is operatively connected, and
   i) unloading the second elastically deformable element in the second opening by deactivating the actuator to which the second elastically deformable element is operatively connected.

5. A method for intermittent coating of a substrate that is in motion using the device according to claim 1, wherein a displaced volume flow remains constant, the method comprising:
   a) continuously supplying a coating substance, proceeding from the supply channel to the outlet gap via the nozzle slot, b) unloading a first of the elastically deformable elements in a first of the openings by deactivating the actuator to which the first elastically deformable element is operatively connected,
c) loading a second of the elastically deformable elements in a second of the openings by activating the actuator to which the second elastically deformable element is operatively connected,
d) loading the first elastically deformable element in the first of the openings by activating the actuator to which the first elastically deformable element is operatively connected, and
e) unloading the second elastically deformable element in the second opening by deactivating the actuator.

6. The device according to claim 1, wherein a thickness of the insertion film is between 0.01 mm and 3.00 mm.

7. The device according to claim 1, wherein the openings are only arranged in the first nozzle jaw, and a second of the nozzle jaws does not have any openings.

\* \* \* \* \*